(12) United States Patent
Hutchinson et al.

(10) Patent No.: US 8,612,356 B2
(45) Date of Patent: Dec. 17, 2013

(54) VOUCHER CODE REDEMPTION VIA SMS

(75) Inventors: Martin Hutchinson, London (GB); David Singleton, London (GB)

(73) Assignee: Google Inc., Mountain View, CA (US)

(*) Notice: Subject to any disclaimer, the term of this patent is extended or adjusted under 35 U.S.C. 154(b) by 72 days.

(21) Appl. No.: 13/295,804

(22) Filed: Nov. 14, 2011

(65) Prior Publication Data

US 2013/0124306 A1   May 16, 2013

(51) Int. Cl.
*G06F 21/00* (2013.01)
*G06Q 30/00* (2012.01)

(52) U.S. Cl.
USPC .......... 705/64; 705/67; 705/14.4; 705/14.47; 705/14.56; 705/14.64

(58) Field of Classification Search
USPC .......................................................... 705/64
See application file for complete search history.

(56) References Cited

U.S. PATENT DOCUMENTS

| | | | |
|---|---|---|---|
| 5,848,396 A | 12/1998 | Gerace | |
| 5,855,007 A | 12/1998 | Jovicic et al. | |
| 5,945,653 A | 8/1999 | Walker et al. | |
| 6,014,634 A | 1/2000 | Scroggie et al. | |
| 6,014,635 A | 1/2000 | Harris et al. | |
| 6,068,183 A | 5/2000 | Freeman et al. | |
| 6,330,543 B1 | 12/2001 | Kepecs | |
| 6,408,307 B1 | 6/2002 | Semple et al. | |
| 6,484,148 B1 | 11/2002 | Boyd | |
| 6,487,538 B1 | 11/2002 | Gupta et al. | |
| 6,497,360 B1 | 12/2002 | Schulze, Jr. | |
| 6,505,046 B1 | 1/2003 | Baker | |
| 6,526,335 B1 | 2/2003 | Treyz et al. | |
| 6,546,257 B1 | 4/2003 | Stewart | |
| 6,571,279 B1 | 5/2003 | Herz et al. | |
| 6,587,835 B1 | 7/2003 | Treyz et al. | |
| 6,601,037 B1 | 7/2003 | Kolls | |
| 6,606,602 B1 | 8/2003 | Kolls | |
| 6,672,507 B1 | 1/2004 | Walker et al. | |
| 6,694,300 B1 | 2/2004 | Walker et al. | |
| 6,711,474 B1 | 3/2004 | Treyz et al. | |
| 6,775,539 B2 | 8/2004 | Deshpande | |
| 6,795,710 B1 | 9/2004 | Creemer | |

(Continued)

FOREIGN PATENT DOCUMENTS

| | | |
|---|---|---|
| EP | 1 164 529 A1 | 12/2001 |
| JP | 2004/265294 A | 9/2004 |

(Continued)

OTHER PUBLICATIONS

U.S. Appl. No. 13/244,904, filed Sep. 28, 2011.

(Continued)

*Primary Examiner* — Calvin L Hewitt, II
*Assistant Examiner* — C. Aaron McIntyre
(74) *Attorney, Agent, or Firm* — Johnson, Marcou & Isaacs, LLC

(57) ABSTRACT

A voucher verification system is based on SMS message-based processing of voucher verifications by a central verification authority. Merchants may establish an account with the system and then register mobile communication devices and those of employees by sending an SMS-based registration request to the system. Once registered, the merchant and employees may verify the status of vouchers by sending SMS-base verification requests to the system. Verifications of voucher status are returned to the merchant mobile device via SMS messaging.

20 Claims, 3 Drawing Sheets

(56) References Cited

U.S. PATENT DOCUMENTS

| | | | |
|---|---|---|---|
| 6,889,054 B2 | 5/2005 | Himmel et al. | |
| 6,932,270 B1* | 8/2005 | Fajkowski | 235/383 |
| 6,947,976 B1 | 9/2005 | Devitt et al. | |
| 6,970,871 B1 | 11/2005 | Rayburn | |
| 7,127,236 B2 | 10/2006 | Khan et al. | |
| 7,200,566 B1 | 4/2007 | Moore et al. | |
| 7,213,027 B1 | 5/2007 | Kominek et | |
| 7,496,527 B2 | 2/2009 | Silverstein et al. | |
| 7,831,246 B1 | 11/2010 | Smith et al. | |
| 7,870,022 B2 | 1/2011 | Bous et al. | |
| 8,320,944 B1* | 11/2012 | Gibson et al. | 455/466 |
| 2001/0054066 A1 | 12/2001 | Spitzer | |
| 2002/0035605 A1 | 3/2002 | McDowell et al. | |
| 2002/0062246 A1 | 5/2002 | Matsubara | |
| 2002/0070976 A1 | 6/2002 | Tanner et al. | |
| 2002/0077907 A1 | 6/2002 | Ukai et al. | |
| 2002/0091569 A1 | 7/2002 | Kitaura et al. | |
| 2002/0091571 A1 | 7/2002 | Thomas et al. | |
| 2002/0111864 A1 | 8/2002 | Ukai et al. | |
| 2002/0128911 A1 | 9/2002 | Furuta | |
| 2002/0138348 A1 | 9/2002 | Narayan et al. | |
| 2003/0004802 A1 | 1/2003 | Callegari | |
| 2003/0028458 A1 | 2/2003 | Gaillard | |
| 2003/0028515 A1 | 2/2003 | Nishikado et al. | |
| 2003/0028518 A1 | 2/2003 | Mankoff | |
| 2003/0040959 A1 | 2/2003 | Fei et al. | |
| 2003/0050831 A1 | 3/2003 | Klayh | |
| 2003/0083941 A1 | 5/2003 | Moran et al. | |
| 2003/0182191 A1 | 9/2003 | Oliver et al. | |
| 2003/0216960 A1 | 11/2003 | Postrel | |
| 2003/0233276 A1 | 12/2003 | Pearlman et al. | |
| 2004/0002897 A1 | 1/2004 | Vishik | |
| 2004/0073482 A1 | 4/2004 | Wiggins et al. | |
| 2004/0098305 A1 | 5/2004 | Truong et al. | |
| 2004/0140361 A1* | 7/2004 | Paul et al. | 235/462.45 |
| 2004/0203852 A1 | 10/2004 | Janakiraman | |
| 2004/0230535 A1 | 11/2004 | Binder et al. | |
| 2004/0249712 A1 | 12/2004 | Brown et al. | |
| 2005/0021401 A1 | 1/2005 | Postrel | |
| 2005/0071230 A1 | 3/2005 | Mankoff | |
| 2005/0075932 A1 | 4/2005 | Mankoff | |
| 2005/0097005 A1 | 5/2005 | Fargo | |
| 2005/0131761 A1 | 6/2005 | Trika et al. | |
| 2005/0222910 A1 | 10/2005 | Wills | |
| 2005/0234771 A1* | 10/2005 | Register et al. | 705/14 |
| 2006/0015405 A1 | 1/2006 | Bala et al. | |
| 2006/0089878 A1 | 4/2006 | Roberts et al. | |
| 2006/0178932 A1 | 8/2006 | Lang | |
| 2006/0258397 A1 | 11/2006 | Kaplan et al. | |
| 2007/0033100 A1 | 2/2007 | Knight | |
| 2007/0073589 A1 | 3/2007 | Vergeyle et al. | |
| 2007/0088610 A1* | 4/2007 | Chen | 705/14 |
| 2007/0088801 A1 | 4/2007 | Levkovitz et al. | |
| 2007/0103993 A1 | 5/2007 | Mount et al. | |
| 2007/0140176 A1 | 6/2007 | Bachenberg | |
| 2007/0143177 A1 | 6/2007 | Graves et al. | |
| 2007/0162341 A1* | 7/2007 | McConnell et al. | 705/14 |
| 2007/0174120 A1 | 7/2007 | Asmar et al. | |
| 2007/0192182 A1 | 8/2007 | Monaco et al. | |
| 2007/0215696 A1* | 9/2007 | Macnish | 235/380 |
| 2007/0226051 A1 | 9/2007 | Addepalli et al. | |
| 2007/0264991 A1 | 11/2007 | Jones et al. | |
| 2007/0270165 A1 | 11/2007 | Poosala | |
| 2007/0276727 A1 | 11/2007 | Thibedeau | |
| 2007/0288313 A1 | 12/2007 | Brodson et al. | |
| 2008/0004888 A1 | 1/2008 | Davis et al. | |
| 2008/0010114 A1* | 1/2008 | Head | 705/14 |
| 2008/0033817 A1 | 2/2008 | Billmaier et al. | |
| 2008/0033857 A1 | 2/2008 | Moses | |
| 2008/0052169 A1* | 2/2008 | O'Shea et al. | 705/14 |
| 2008/0077484 A1 | 3/2008 | Main et al. | |
| 2008/0082424 A1 | 4/2008 | Walton | |
| 2008/0097844 A1 | 4/2008 | Hsu et al. | |
| 2008/0097851 A1 | 4/2008 | Bemmel et al. | |
| 2008/0133351 A1 | 6/2008 | White et al. | |
| 2008/0154727 A1 | 6/2008 | Carlson | |
| 2008/0288406 A1 | 11/2008 | Seguin et al. | |
| 2009/0048926 A1 | 2/2009 | Salesky et al. | |
| 2009/0164366 A1* | 6/2009 | Blythe | 705/39 |
| 2010/0114686 A1 | 5/2010 | Carlson et al. | |
| 2010/0121697 A1* | 5/2010 | Lin et al. | 705/14.14 |
| 2010/0122274 A1 | 5/2010 | Gillies et al. | |
| 2010/0318407 A1* | 12/2010 | Leff et al. | 705/10 |
| 2011/0010352 A1* | 1/2011 | Jockisch et al. | 707/706 |
| 2011/0015987 A1* | 1/2011 | Chakraborty et al. | 705/14.39 |
| 2011/0125565 A1 | 5/2011 | MacIlwaine et al. | |
| 2011/0145057 A1* | 6/2011 | Jones et al. | 705/14.42 |
| 2011/0161149 A1 | 6/2011 | Kaplan | |
| 2011/0202399 A1* | 8/2011 | Ku | 705/14.15 |
| 2012/0016757 A1 | 1/2012 | Lee et al. | |
| 2012/0035977 A1 | 2/2012 | Burgess et al. | |
| 2012/0066048 A1* | 3/2012 | Foust et al. | 705/14.26 |
| 2012/0123847 A1 | 5/2012 | Wane et al. | |
| 2012/0185311 A1 | 7/2012 | Tavares et al. | |
| 2012/0316949 A1* | 12/2012 | Chen | 705/14.26 |

FOREIGN PATENT DOCUMENTS

| | | |
|---|---|---|
| KR | 2002/094340 A | 12/2002 |
| KR | 2003-0012235 | 2/2003 |
| KR | 2005/0053271 | 6/2005 |
| KR | 2006/061515 A | 6/2006 |
| KR | 2006/083825 A | 7/2006 |
| KR | 2007/030467 A | 3/2007 |
| WO | WO 02/073489 | 9/2002 |
| WO | WO 2005/103968 A1 | 11/2005 |
| WO | WO 2012/009655 A2 | 1/2012 |

OTHER PUBLICATIONS

U.S. Appl. No. 13/244,909, filed Sep. 26, 2011.
U.S. Appl. No. 13/244,913, filed Sep. 26, 2011.
U.S. Appl. No. 13/477,036, filed May 21, 2012.
U.S. Appl. No. 11/855,143, filed Sep. 13, 2007.
U.S. Appl. No. 13/461,367, filed May 1, 2012.
U.S. Appl. No. 13/271,988, filed Oct. 12, 2011.
U.S. Appl. No. 12/972,216, filed Dec. 17, 2010.
U.S. Appl. No. 12/979,024, filed Dec. 27, 2010.
U.S. Appl. No. 13/253,561, filed Oct. 5, 2011.
U.S. Appl. No. 13/614,402 to Freed-Finnegan et al. filed Sep. 13, 2012.
U.S. Appl. No. 13/759,012 to Freed-Finnegan et al. filed Feb. 4, 2013.
Title: Power of Real Time (Brief Article), Publ: *Crain's New York Business*, pp. 1, Date: Oct. 30, 2000.
Title: Launch of WindWire Undisputed Success; Leader in Wireless Advertising Solutions Serves Over One Million Ads With Click-through Rates of More than 15 Percent in First Week of Launch, Publ: *Business Wire*, pp. 1-2, Date: Oct. 17, 2000.
Title: [x+1] Personalizes Web Optimization with New, Patented Technology, Publ: *PR Newswire*, pp. 1-3, Date: Sep. 18, 2007.
Title: The Next Wave in Advertising, Publ: *New Straits Times*, pp. 1-6, Date: Jul. 2, 2000.
Title: WindWire Launches WindCaster; Wirelss Ad Network Delivers Marketing and Advertising Over the New Wireless Web Medium, Publ: *Business Wire*, pp. 1-4, Date: Jun. 27, 2000.
Title: Personalised Information to Mobile Users-Add2Phoen and Setec to Co-operate in Mobile e-Commerce, Publ: *M2 Presswire*, pp. 1-5, Date: Apr. 20, 2000.
Title: AOL Digital City Kicks Off Major Expansion to Widen Lead in Fast-growing Local Online Market, Publ: *Business Wire*, pp. 1-5, Date: Mar. 21, 2000.
Title: Alcatel Introduces Advanced Version of Its Intelligent Location-Based Server, Publ: *Canadian Corporate News*, pp. 1-3, Date: Mar. 20, 2001.
Title: Smart AdServer Targets Quova for Geolocation Needs; Adserving Innovator Switches to Quova for Reliability and Depth of Data, Publ: *CCNMatthews Newswire*, pp. 1-3, Date: Feb. 5, 2008.
Title: Digital Island Corrects and Replaces Previous News Release, BW2059, CA—Digital Island, Publ: *Business Wire*, pp. 1-4, Date: Jan. 22, 2001.

(56) References Cited

OTHER PUBLICATIONS

Author: Glairon, Susan, Title: New Marketing Scheme Brings Online Ads to Boulder, Colo., Wireless Customers, Publ: *Knight Ridder/Tribune Business News*, Date: Aug. 6, 2000.

Author: Jason, Title: Visa to Develop Mobile Payment-Related Services for Android Platform, Publ: *FierceWireless* http://fiercewireless.com, pp. 1-3, Date: Sep. 25, 2008.

Author: Littman, Sarah, Title: On the Verge: The Users are Catching Up with the Technology in the U.S. Mobile Marketing Arena. Are you ready to capitalize on a new marketing medium that is almost ready for its close-up?, Publ: *Response*, pp. 1-9, Date: Feb. 1, 2008.

Author: McCammon, S., Title: Ladies, It's Your Night for a Bargain (Neighbor), Publ: *Daily Herald*, pp. 1-2, Date: Feb. 5, 2004.

Author: McNair, L., Title: Blackberry Pushes a Sweet Solution, Publ: *Federal Computer Week*—http://few.com/articles/2000/11/05/blackerry-pushes-a-, pp. 40-42, Date: Nov. 6, 2000.

Author: Parekh, Sunjay, Title: Personalization: Turn Browsers into Buyers: Gathering Customer Intelligence is an Art and a Science, Publ: *e-Business Advisor*, pp. 1-8, Date: Sep. 1, 2002.

\* cited by examiner

VOUCHER CODE REDEMPTION VIA SMS

TECHNICAL FIELD

The present disclosure relates generally to a system for verifying merchant-issued vouchers using a central verification authority, and more particularly to methods and systems that enable merchants to verify such vouchers using SMS-based verification requests.

BACKGROUND

The use of vouchers containing discounts or other offers are a fundamental tool merchants use to incentivize consumers to purchase their products. However, to prevent abuse of vouchers, merchants need to verify that a voucher is valid, including determining whether the voucher has been previously redeemed. Current systems utilize online verification or voice response telephonic verification-based systems. For online verification, the merchant must have access to the Internet at every point of sale (POS) terminal. This requirement places an unnecessary limitation on the flexibility merchants can utilize in where and how they process payment transactions. Telephonic transactions require the merchant to call a central location, interact via voice or keypad, and hold on the phone while waiting for verification. This process creates an unnecessary hindrance in the merchant's ability to engage their customers during the payment transaction. Accordingly, there is a need for a voucher verification system that does not require investment in specialized equipment and that allows merchants to complete the overall payment transaction with minimum service disruption.

SUMMARY

In certain exemplary aspects, a method for verifying the validity of vouchers comprises receiving a short message service ("SMS")-based voucher verification request from a merchant mobile device, identifying the status of a voucher associated with the voucher verification request, and communicating the voucher status to the mobile device in a voucher verification SMS message. The validity of the voucher may be based on a number of times the voucher was previously redeemed, an expiration date, or both. The voucher status may be defined in a voucher record stored in a voucher index, where the voucher record is identified by a unique voucher identifier. The method may further comprise registering one or more merchant mobile devices by receiving an SMS-based registration request from one or more merchant mobile devices. Registration includes creating a merchant account identifier and a security code assigned to the merchant account.

These and other aspects, objects, features, and advantages of the invention will become apparent to those having ordinary skill in the art upon consideration of the following detailed description of illustrated exemplary embodiments, which include the best mode of carrying out the invention as presently perceived.

DETAILED DESCRIPTION OF EXEMPLARY EMBODIMENTS

Overview

Figure 1:
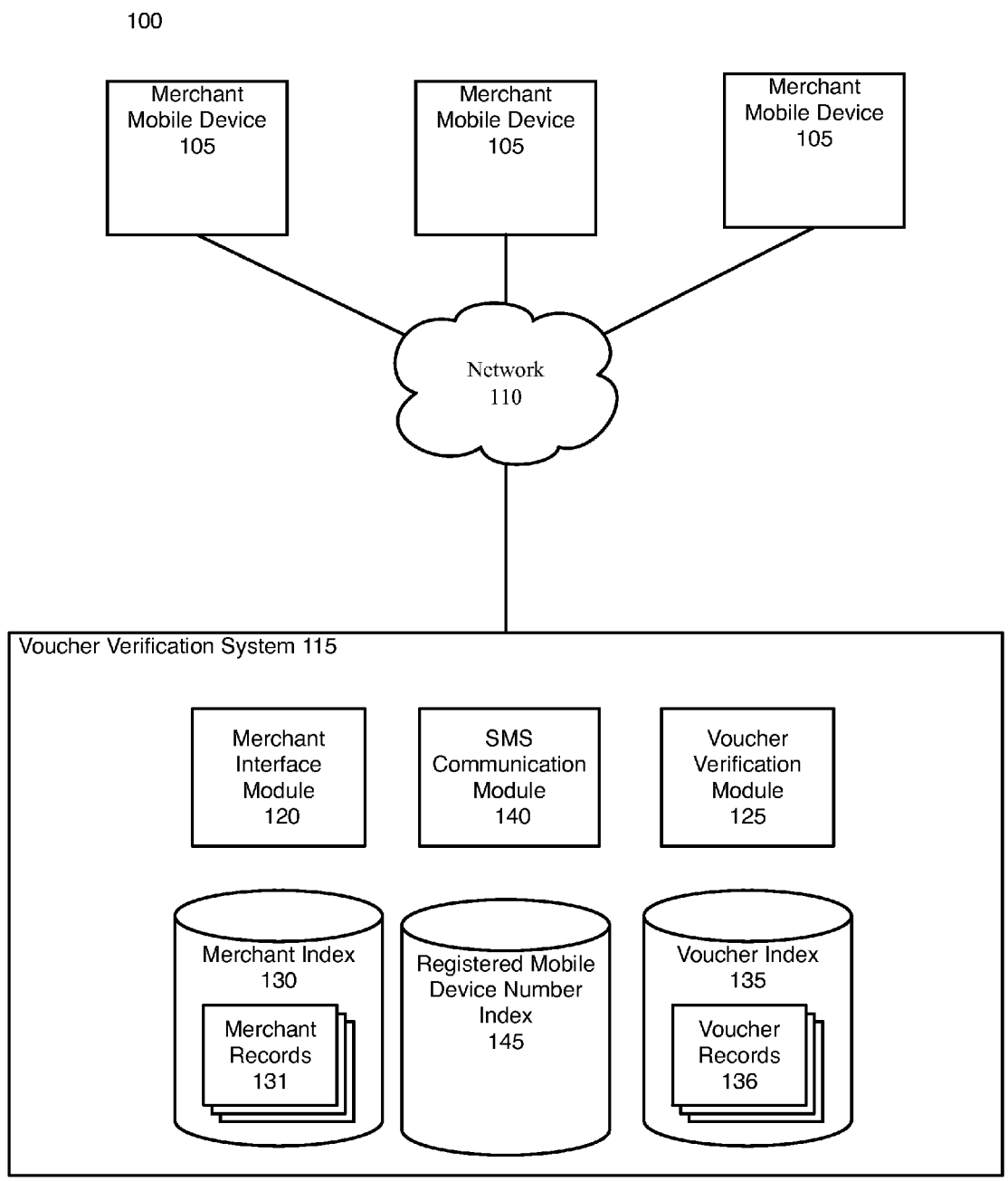
FIG. 1 is a block diagram depicting a merchant voucher verification system according to an exemplary embodiment.

The methods and systems described herein enable a merchant to verify the validity of a voucher with minimal investment in additional equipment or employee training and with minimal interference while processing a payment transaction. Rather than requiring access to a web browser at every point of sale, or requiring employees to juggle telephonic verification while interacting with the client, the present invention allows the merchant and any number of employees to initiate a verification procedure using a mobile device via SMS messaging. A merchant registers a verification account with a voucher verification system and is assigned a unique merchant identifier and security code. To register a mobile device with the voucher verification system, the merchant sends an SMS message to the voucher verification system. The SMS message includes the merchant identification number and security code. The voucher verification system verifies that the merchant identifier and security code match the information associated with the merchant account. If the registration information is correct, the merchant mobile device is registered with the merchant account in the voucher verification system, for example, by registering the telephone number of the mobile device with the merchant account. Once registered, the mobile device can be used to process voucher verifications. The registration process can be performed for any number of mobile devices desired by the merchant. The merchant also creates in or uploads to the voucher verification system one or more voucher records containing information corresponding to the vouchers the merchant will issue. A unique voucher identifier is associated with each voucher record. When a merchant is presented with a voucher from a customer, the merchant uses a registered mobile device to send an SMS-based verification request to the voucher verification system. The verification request includes the unique voucher identifier. Additionally, the voucher verification system determines the telephone number associated with the mobile device and identifies the merchant account based on the telephone number. The voucher verification system utilizes the unique voucher identifier to cross-reference the voucher index and identify the corresponding voucher record. The voucher record further defines a voucher status. If the voucher has expired or otherwise has exhausted the number of times it may be redeemed, the voucher verification system generates a return SMS-communication to the merchant mobile device indicating the voucher is invalid. If the unique voucher identifier is associated with the merchant and the voucher record indicates that the voucher is valid, the voucher verification system generates a return SMS-communication to the merchant mobile device indicating the voucher is valid.

One or more aspects of the invention may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer as more than one computer may perform the act. The inventive functionality of the invention will be explained in more detail in the following description, read in conjunction with the figures illustrating the program flow.

Turning now to the drawings, in which like numerals indicate like (but not necessarily identical) elements throughout the figures, exemplary embodiments are described in detail.

System Architecture

FIG. 1 is a block diagram depicting a voucher verification system 100 according to an exemplary embodiment. As depicted in FIG. 1, the system 100 includes network devices 105 and 115 that are configured to communicate with one another via one or more networks 110.

Each network 110 includes a wired or wireless telecommunication means by which network devices (including devices 105 115) can exchange data. For example, each network 110 can include a Global System for Mobile Communications (GSM), Universal Mobile Telecommunications System (UMTS), Code Division Multiple Access (CDMA), and/or other wireless network for communication of SMS messages. In additional or alternative exemplary embodiments, each network 110 can include a local area network ("LAN"), a wide area network ("WAN"), an intranet, an Internet, a mobile telephone network, or any combination thereof for communication of SMS messages. Throughout the discussion of exemplary embodiments, it should be understood that the terms "data" and "information" are used interchangeably herein to refer to text, images, audio, video, or any other form of information that can exist in a computer-based environment.

Each network device 105 and 115 includes a device having a communication module capable of transmitting and receiving data over the network 110. For example, each merchant mobile device 105 has a communication module capable of transmitting and receiving SMS messages over the network 110. In exemplary embodiments, each network device 105 can comprise a mobile phone, smart phone, personal digital assistant ("PDA"), or tablet computer. Each network device 115 can include a server, desktop computer, laptop computer, tablet computer, smart phone, handheld computer, personal digital assistant ("PDA"), or any other wired or wireless, processor-driven device capable of receiving and processing SMS messages.

In certain exemplary embodiments, the voucher verification system 115 comprises a merchant interface module 120, a voucher verification module 125, a merchant index 130 including merchant account records 131, a voucher index 135 including voucher records 136, an SMS communication module 140, and a registered mobile device number index 145. The merchant interface module 120 generates a user interface that allows a merchant to register for and manage a merchant account with the voucher verification system 115. Information pertaining to each merchant account is stored as a merchant account record 131 in the merchant account index 130 in communication with the merchant account interface module 120. The merchant interface module 120 also processes mobile device 105 registration requests received from merchant mobile devices. Upon registration, the merchant interface module 120 links the merchant mobile device 105 with the corresponding merchant record 131. Optionally, the merchant interface module may store a mobile device number associated with the merchant mobile device 105 in the registered mobile device number index 145. The voucher verification module 125 processes voucher information contained in SMS-based voucher verification requests received from registered merchant mobile devices 105 and determines if the voucher information is valid by cross-referencing a voucher identifier from the request with information stored in the voucher index 135. The voucher index 135 contains voucher records 136 established by a merchant and comprising at least a unique voucher identifier. The SMS communication module 140 receives SMS-based communications from merchant mobile devices 105 and directs the SMS message to the merchant interface module 120 and voucher verification module 125 depending on the type of request received from the merchant mobile device 105.

The voucher verification system 115 is described in more detail hereinafter with reference to the methods depicted in FIGS. 2-3.

System Process

Figure 2:
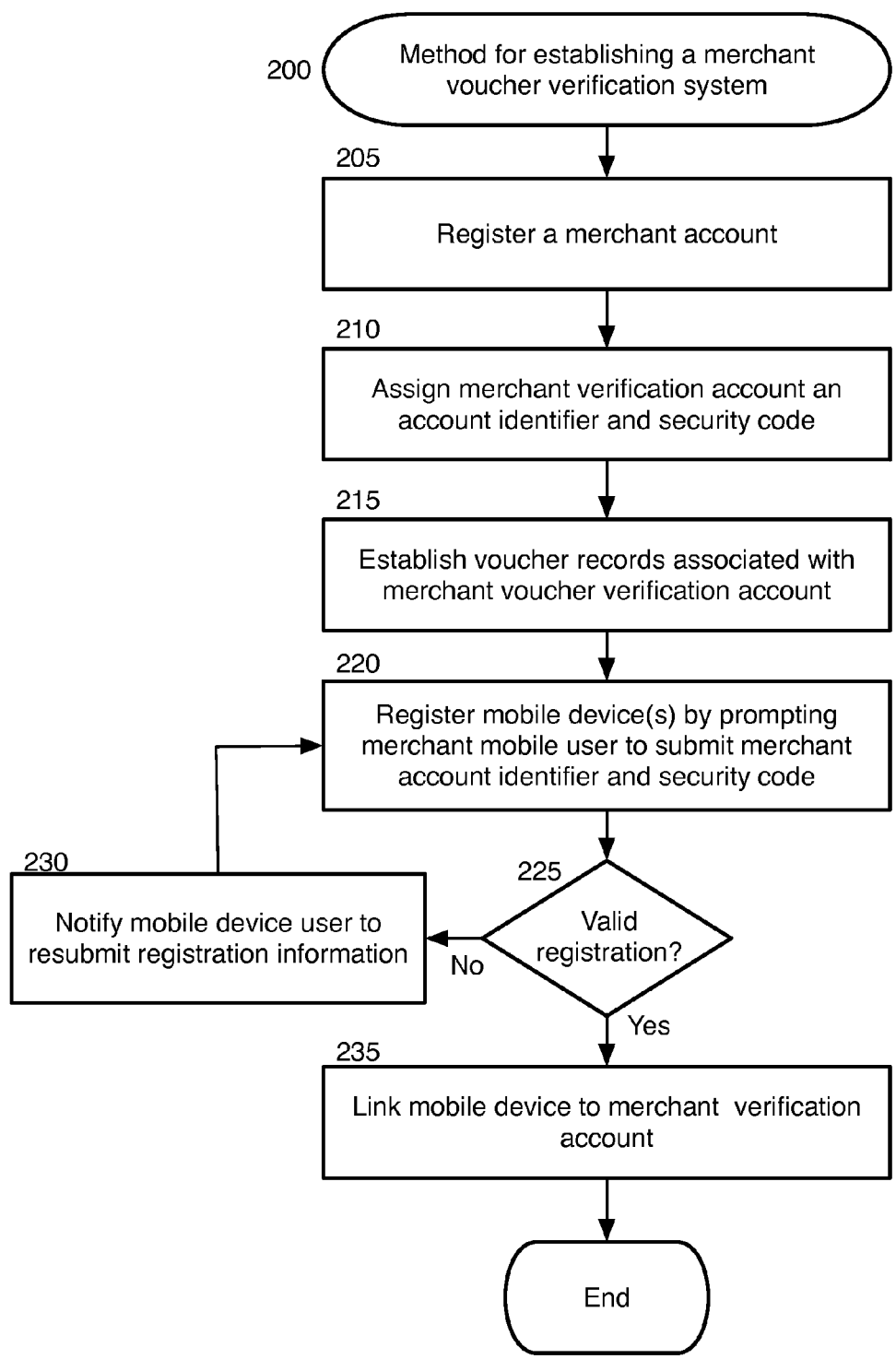
FIG. 2 is a block flow diagram depicting a method for establishing a merchant voucher verification system according to an exemplary embodiment.

FIG. 2 is a block flow diagram depicting a method 200 for establishing a voucher verification system 100 according to an exemplary embodiment. The method 200 is described with reference to the components illustrated in FIG. 1.

Method 200 begins with block 205, in which a merchant establishes, through the merchant interface module 120, a merchant account. The merchant interface module 120 generates a user interface that allows the voucher verification system to obtain merchant-specific information needed to establish an account. The merchant-specific information comprises at least a merchant name. The merchant account interface module 120 creates and stores this information in a merchant account record 131. The merchant account records are indexed and stored in a merchant account index 130. In one exemplary embodiment, a merchant communicates with the merchant interface module 120 through a web browser or other dedicated application, such as a mobile application, via the network 110. The merchant may conduct this step via a merchant network device 105 or via another network device (not illustrated in FIG. 1) that can communicate with the voucher verification system 115 via the network 110. In another exemplary embodiment, the merchant communicates with the merchant account interface module through SMS messaging using the merchant mobile device 105. For example, a merchant may text the command "register account," or a variant thereof, to a dedicated telephone number associated with the voucher verification system 115. The SMS message is received by the SMS communication module 140 and directed to the merchant interface module 120. The merchant interface module 120 then prompts the merchant for the required merchant-specific information, sequentially or concurrently, via a return SMS message(s) sent via the SMS communication module 140 to the merchant mobile device 105. For example, the merchant interface module may first prompt the user for a merchant name followed by additional prompts for additional merchant-specific information. Exemplary information obtained in step 205 can include merchant name, merchant location(s), merchant contact information, and other suitable information.

At block 210, the merchant account interface module 120 assigns the merchant account a merchant account identifier and a security code. The merchant account interface module 120 then communicates this account identifier and security code to the merchant. The communication of the merchant account identifier and security code may be through direct display on the user interface, electronic mail, an SMS message or any other suitable communication mechanism.

At block 215, the merchant account interface module 120 receives voucher information from the merchant. The voucher information comprises identifying information such as the product or products to which the voucher applies and the value of the voucher. The voucher information may further include a unique identifier, an expiration date, and a specified number of allowed redemptions. The unique identifier can be assigned prior to uploading to the voucher verification system 115 or may be assigned by the merchant account module 120. For example, where vouchers are created in a separate system and the voucher information is imported into the voucher verification system 115, the originating system may assign the voucher a unique identifier. If a unique identifier has not previously been assigned to the voucher, the merchant interface module 120 can assign a unique identifier to each voucher. The voucher information and associated identifier for each voucher of the merchant are stored in voucher records 136 which are indexed and stored in a voucher index 135. Each voucher record 136 is also associated with the corresponding merchant record 131 for the merchant registering the vouchers. In an exemplary embodiment, the voucher information may be entered directly in the voucher verification system 115 via the user interface generated by the merchant interface module 120. The voucher information is then exported to a separate voucher distribution system (not illustrated in FIG. 1) for distribution through various distribution channels to consumers. In an alternative exemplary embodiment, the voucher distribution system or other voucher creation system can assign the unique voucher identifiers for each voucher, and the assigned information can be imported into the voucher verification system 115 and associated with the appropriate voucher records 136 and merchant record 131 for the particular merchant.

In an exemplary embodiment, a voucher represents an offer issued by the merchant for redemption by a consumer. For example, a voucher may comprise a coupon, loyalty offer, prepaid offer, or other discount provided by the merchant. A prepaid offer is an offer purchased by a consumer that provides value more than the purchase price. Each issued voucher includes a unique identification number to prevent multiple redemptions of the same voucher.

At block 220, a merchant and/or an employee of the merchant (collectively, a user of the merchant mobile device 105) communicates an SMS message from the merchant mobile device 105 to a dedicated telephone number associated with the voucher verification system 115. In an exemplary embodiment, the initial SMS message may include a command prompt, such as "register device," or a variant thereof. The SMS message is received by the SMS communication module 140 and directed to the merchant account interface module 120. The merchant account interface module 120 then prompts the user of the merchant mobile device 105 to enter the merchant account identifier and the security code, collectively the registration information. The user then uses the merchant mobile device 105 to communicate the merchant account identifier and security code to the security verification system 115. The SMS communication module 140 receives the registration information and directs the information to the merchant interface module 120. In an exemplary embodiment, the submission of the "register device" request and the merchant registration information may be provided in one SMS message from the merchant mobile device 105 to the voucher verification system 115.

At block 225, the merchant interface module 120 determines if the registration information is valid by cross-referencing the merchant records 131 in the merchant index 130 to identify a merchant record 131 having the same registration information. If the registration information does not match registration information stored in the merchant index 130, the method 200 proceeds to block 230.

At block 230, the merchant interface module 120 communicates an SMS message via the SMS communication module 140 to the merchant mobile device 105, notifying the user of the merchant mobile device that the submitted registration information was invalid and requesting that the user re-submit the registration information. The process of blocks 220 and 225 may then be repeated. If the user of the merchant mobile device 105 does not re-submit the registration information the method 200 will end.

Returning to block 225, if the merchant account interface module 120 determines that the registration information is valid, the method 200 then proceeds to block 235.

At block 235, the merchant interface module 120 links the merchant mobile device 105 to the merchant account record 131 associated with the registration information. In an exemplary embodiment, the mobile device may be linked by storing the mobile device number in the corresponding merchant account record 131, storing the registered mobile device number in an optional registered mobile device index 145, or a combination thereof. Once linked, the merchant mobile device 105 can be used to send voucher verification requests to the voucher verification system 115.

After block 235, the method 200 ends.

Figure 3:
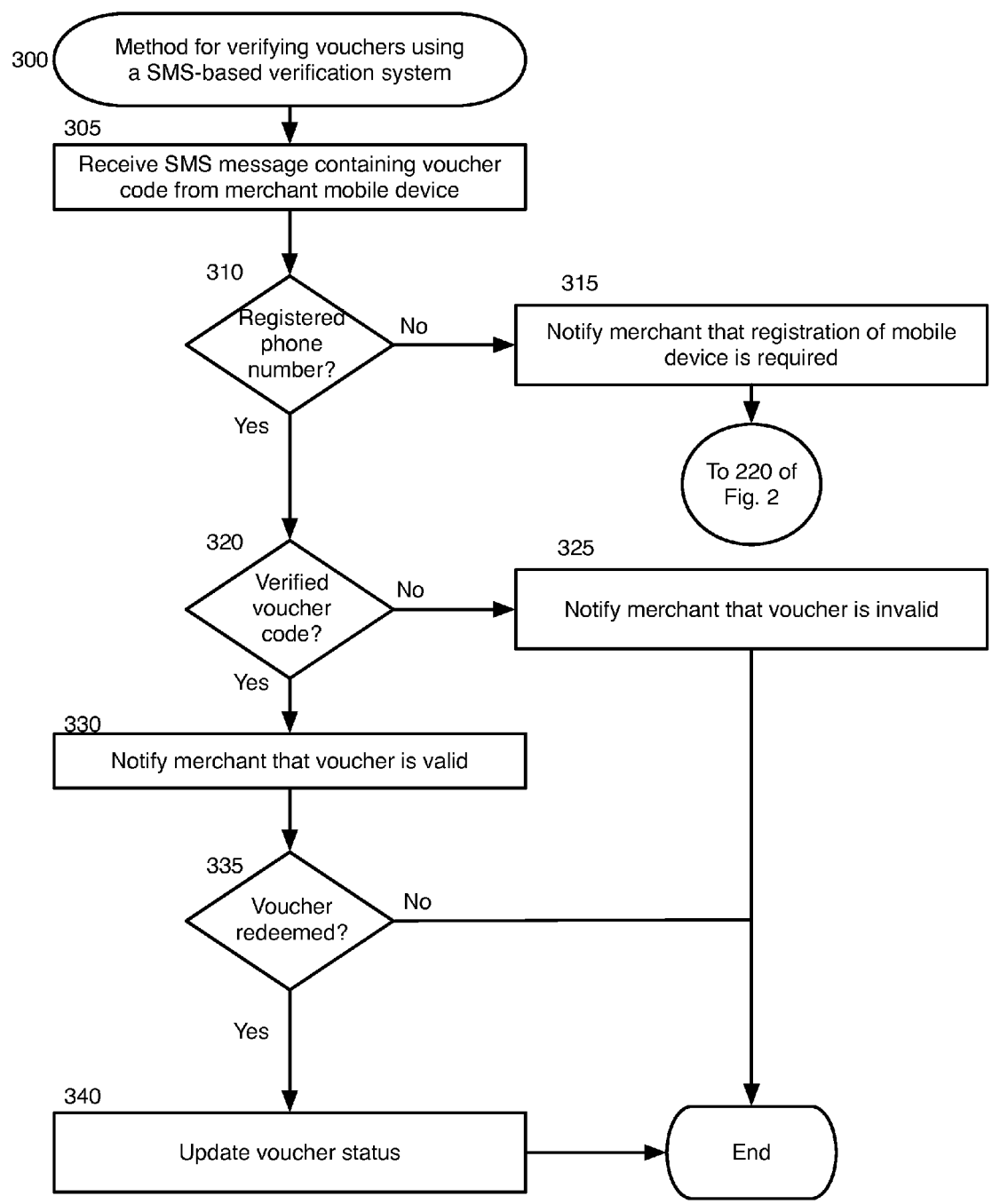
FIG. 3 is a block flow diagram depicting a method for verifying a voucher using SMS messaging according to an exemplary embodiment.

FIG. 3 is a block flow diagram depicting a method for verifying vouchers using an SMS-based verification system according to an exemplary embodiment. The method 300 is described with reference to the components illustrated in FIG. 1.

At block 305, the SMS communication module 140 receives an SMS-based verification request from a merchant mobile device 105. The SMS message may contain a command prompt such as "verify" or a variant thereof and the voucher identification number. The SMS communication module 140 directs the request to the merchant account interface module 120. In exemplary embodiment, the SMS message may comprise only the verification information, and the voucher verification system 115 will recognize the SMS message as a request for verification.

In operation, a customer presents a voucher to the merchant for redemption. Prior to redeeming the voucher, the merchant would like to determine that the voucher is valid. To determine whether the voucher is valid, the merchant communicates the voucher identification number to the voucher verification system 115. In an exemplary embodiment, the merchant operates the merchant mobile device to "text" the voucher verification code on the voucher to the voucher verification system 115 via an SMS message.

As used herein, "valid" refers to whether a voucher is associated with the merchant and whether the voucher has expired or exceeded a specified number of redemptions.

At block 310, the merchant account interface module 120 verifies that the phone number of the merchant mobile device 105 is a registered mobile device by cross-referencing the merchant account index 130 or the optional registered phone number index 145. If the mobile device phone number is not a registered mobile device number, the method 300 proceeds to block 315.

At block 315, the merchant interface module 120 generates and communicates a return notification to the mobile device 105, notifying the user that the phone number requires registration before the verification request can be processed. The notification may include further prompts regarding how to register the mobile device phone number using the process described above beginning at block 220 of FIG. 2. If further information is not received, the method 300 does not proceed.

Returning to block 310, if the merchant interface module 120 determines that the mobile device number is registered, the merchant interface module 120 communicates the registration information to the voucher verification module 125, and the method 300 proceeds to block 320. In certain exemplary embodiments, the command prompt may first be communicated separately from any verification information, in which case the merchant account interface module 120 will send a return message prompting the merchant mobile device 105 user to send the verification information. The SMS communication module 140 will then direct the verification information directly to the voucher verification module 125. In another exemplary embodiment, the verification information may be communicated to the voucher verification system 115 concurrently with the command prompt or initially without a command prompt. The verification information comprises at least the unique voucher identifier.

At block 320, the voucher verification module 125 determines whether the voucher associated with the voucher identifier is valid by cross-referencing the voucher records 136 in the voucher index 135. The voucher verification module 125 first determines if a matching voucher identifier exists in the voucher index 135. Next, the voucher verification module 125 determines if the voucher meets all validation criteria. For example, if the voucher has an expiration date set in the voucher record 136, the voucher verification module 125 will determine if the voucher is expired. Likewise, if the voucher has a set number of times the voucher can be redeemed, the voucher verification module 125 will determine if any additional redemptions are allowed. If the voucher fails on any such criteria, the method proceeds to block 325.

At block 325, the voucher verification module 125 communicates a return SMS notification message to the merchant mobile device 105 indicating that the voucher is invalid. The user of the merchant mobile device 105 is then in a position to deny processing of the voucher, and the method 300 ends.

Returning to block 320, if the voucher verification module 125 determines that the voucher passes all validation criteria, the method proceeds to block 330.

At block 330, the voucher verification module 125 generates a return SMS-message and communicates the SMS-message to the merchant mobile device 105 via the SMS communication module 140, notifying the user that the voucher is valid. The SMS-message also may prompt the user of the merchant mobile device 105 to confirm whether the voucher will be or has been redeemed with the payment transaction.

At block 340, the voucher verification module determines if a confirmation that the voucher will be or has been redeemed is received from the merchant mobile device 105. In certain exemplary embodiment, the voucher verification module 125 may wait for a pre-defined period of time. If a response is not received, the method 300 ends and updates are not made to the voucher status. Similarly, if the mobile merchant device 105 communicates a reply SMS message confirming that the voucher will not be redeemed, the method 300 ends, and an update is not made to the voucher status. If the merchant mobile device 105 communicates a reply SMS message to the voucher verification system 115 confirming that the voucher will be or has been redeemed, the voucher verification module 125 updates the status of the voucher record 136 associated with the voucher identifier accordingly. For example, if additional redemptions are allowed, the voucher verification system 125 will update the voucher record 136 to reflect the number of remaining redemptions available. If the voucher was a single user voucher, the voucher verification module 126 updates the voucher status to invalid.

From block 340, the method 300 ends.

General

The exemplary systems, methods, and blocks described in the embodiments presented previously are illustrative, and, in alternative embodiments, certain blocks can be performed in a different order, in parallel with one another, omitted entirely, and/or combined between different exemplary methods, and/or certain additional blocks can be performed, without departing from the scope and spirit of the invention. Accordingly, such alternative embodiments are included in the invention described herein.

The invention can be used with computer hardware and software that performs the methods and processing functions described above. As will be appreciated by those having ordinary skill in the art, the systems, methods, and procedures described herein can be embodied in a programmable computer, computer executable software, or digital circuitry. The software can be stored on computer readable media. For example, computer readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays ("FPGA"), etc.

Although specific embodiments of the invention have been described above in detail, the description is merely for purposes of illustration. Various modifications of, and equivalent blocks corresponding to, the disclosed aspects of the exemplary embodiments, in addition to those described above, can be made by those having ordinary skill in the art without departing from the spirit and scope of the invention defined in the following claims, the scope of which is to be accorded the broadest interpretation so as to encompass such modifications and equivalent structures.

What is claimed is:

1. A computer-implemented method for verifying merchant issued vouchers, comprising:

receiving, at a computer, a registration request short message service ("SMS") message from a mobile communication device, wherein the registration request SMS message comprises a merchant account identifier and a security code;

verifying, by the computer, that the merchant account identifier in the registration request SMS message matches a merchant account identifier stored in a merchant index and that the security code in the registration request SMS message matches a security code assigned to the merchant account identifier, and determining that the merchant account identifier and security code are associated with a merchant account;

registering, by the computer, the mobile communication device by linking a mobile communication device number of the mobile communication device with the merchant account in response to determining that the merchant account identifier and security code are associated with the merchant account;

generating, by the computer, a registration confirmation SMS message indicating that the mobile communication device is registered with the merchant account;

communicating, by the computer, the registration confirmation SMS message to the mobile communication device;

receiving, by the computer, a voucher verification request SMS message from the mobile communication device, the voucher verification request SMS message comprising a voucher identifier for a voucher associated with the merchant account;

determining, by the computer, that the mobile communication device is registered with the merchant account;

identifying, by the computer, a voucher status of the voucher associated with the voucher identifier;

generating, by the computer, a voucher verification SMS message including the voucher status; and communicating, by the computer, the voucher verification SMS message to the mobile communication device.

2. The computer-implemented method of claim 1, further comprising storing, by the computer, a voucher record in a voucher index prior to receiving the voucher verification request SMS message, wherein the voucher record comprises the unique voucher identifier for the voucher.

3. The computer-implemented method of claim 2, wherein the voucher record further comprises a limit on a number of times the voucher can be redeemed.

4. The computer-implemented method of claim 2, wherein the voucher record further comprises an expiration date for the voucher.

5. The computer-implemented method of claim 1, wherein the voucher status is valid or invalid, and wherein the voucher status is based on at least one of the previous number of times the voucher has been redeemed and whether the voucher has expired.

6. The computer-program product code of claim 1, further comprising updating the voucher status in the voucher record after a status of the voucher is identified as valid.

7. A computer program product, comprising:
a non-transitory computer-readable medium having computer-readable program instructions embodied thereon that when executed by a computer processor cause the computer to execute the steps of:
receiving a registration request short message service ("SMS") message from a mobile communication device, wherein the registration request SMS message comprises a merchant identifier and a security code;
verifying that the merchant account identifier in the registration request SMS message matches a merchant account identifier stored in a merchant index and that the security code in the registration request SMS message matches a security code assigned to the merchant account identifier, and determining that the merchant account identifier and security code are associated with a merchant account;
registering the mobile communication device by linking a mobile communication device number of the mobile communication device with the merchant account in response to determining that the merchant account identifier and security code are associated with the merchant account;
receiving a voucher verification request SMS message from the mobile communication device, the voucher verification request SMS message comprising a voucher identifier for a voucher associated with the merchant account;
determining that the mobile communication device is registered with the merchant account;
identifying a voucher status of the voucher associated with the voucher identifier;
generating a voucher verification SMS message including the voucher status; and
communicating the voucher verification SMS message to the mobile communication device.

8. The computer program product of claim 7, further comprising computer-readable program instructions that when executed by the computer processor cause the computer to execute the steps of:
generating a registration confirmation SMS message indicating that the mobile communication device is registered with the merchant account; and
communicating the registration confirmation SMS message to the mobile communication device.

9. The computer program product of claim 7, further comprising computer-executable program instructions that when executed by the computer processor cause the computer to execute the step of storing a voucher record in a voucher index prior to receiving the voucher verification request SMS message, wherein the voucher record comprises the unique voucher identifier for the voucher.

10. The computer program product of claim 9, wherein the voucher record further comprises a limit on a number of times the voucher can be redeemed.

11. The computer program product of claim 9, wherein the voucher record further comprises an expiration date for the voucher.

12. The computer program product of claim 7, wherein the voucher status is valid or invalid, and wherein the voucher status is based on at least one of the previous number of times the voucher has been redeemed and whether the voucher has expired.

13. The computer program product of claim 7, further comprising computer-executable program instructions that when executed by the computer processor cause the computer to execute the step of updating the voucher status in the voucher record after a status of the voucher is identified as valid.

14. A system to verify merchant issued vouchers, the system comprising:
a storage device; and
a processor communicatively coupled to the storage device, wherein the processor executes application code instructions that are stored in the storage device and that cause the system to execute the steps of:
receiving a registration request short message service ("SMS") message from a mobile communication device, wherein the registration request SMS message comprises a merchant account identifier and a security code;
verifying that the merchant account identifier in the registration request SMS message matches a merchant account identifier stored in a merchant index and that the security code in the registration request SMS message matches a security code assigned to the merchant account identifier, thereby determining that the merchant account identifier and security code are associated with a merchant account;
registering the mobile communication device by linking a mobile communication device number of the mobile communication device with the merchant account in response to determining that the merchant account identifier and security code are associated with the merchant account;
receiving a voucher verification request SMS message from a the mobile communication device, the voucher verification request SMS message comprising a voucher identifier for a voucher associated with the merchant account;

determining that the mobile communication device is registered with the merchant account;

identifying a voucher status of the voucher associated with the voucher identifier;

generating a voucher verification SMS message including the voucher status; and communicating the voucher verification SMS message to the mobile communication device.

15. The system of claim 14, wherein the processor further executes application code instructions that cause the system to execute the steps of:

generating a registration confirmation SMS message indicating that the mobile communication device is registered with the merchant account; and communicating the registration confirmation SMS message to the mobile communication device.

16. The system of claim 14, wherein the processor further executes application code instructions that cause the system to execute the step of storing a voucher record in a voucher index prior to receiving the voucher verification request SMS message, wherein the voucher record comprises the unique voucher identifier for the voucher.

17. The system of claim 16, wherein the voucher record further comprises a limit on a number of times the voucher can be redeemed.

18. The system of claim 16, wherein the voucher record further comprises an expiration date for the voucher.

19. The system of claim 14, wherein the voucher status is valid or invalid, and wherein the voucher status is based on at least one of the previous number of times the voucher has been redeemed and whether the voucher has expired.

20. The system of claim 14, wherein the processor further executes application code instructions that cause the system to execute the step of updating the voucher status in the voucher record after a status of the voucher is identified as valid.

* * * * *